UNITED STATES PATENT OFFICE.

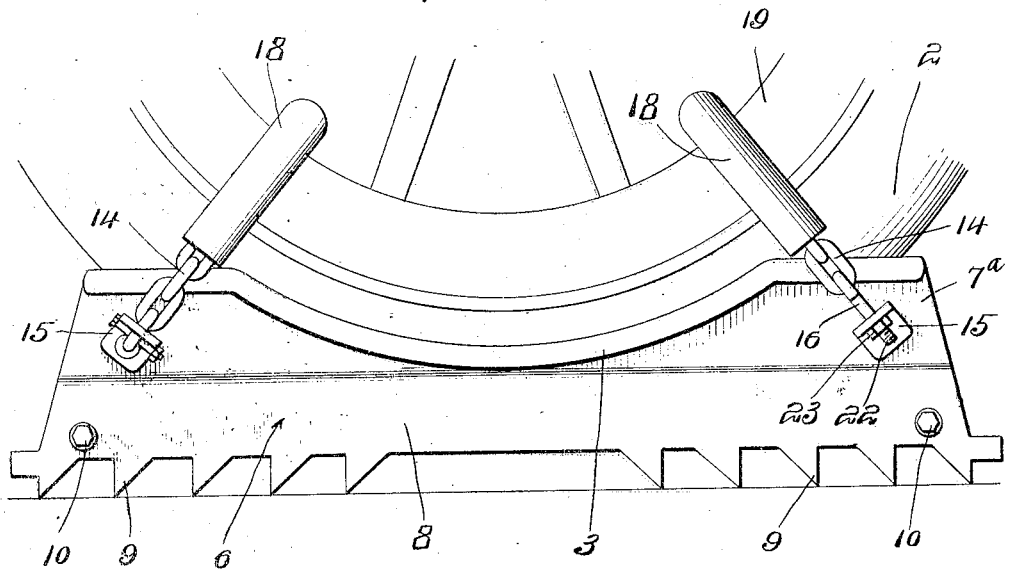
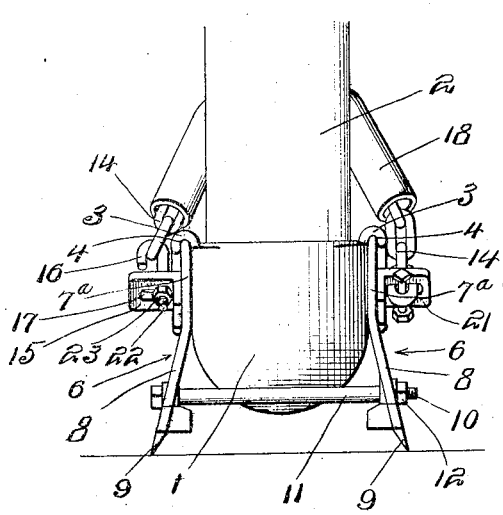
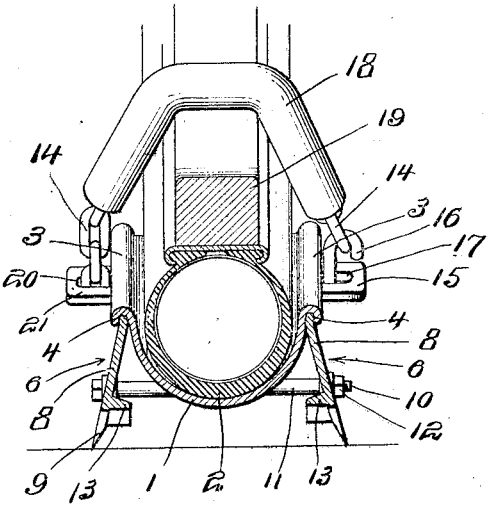

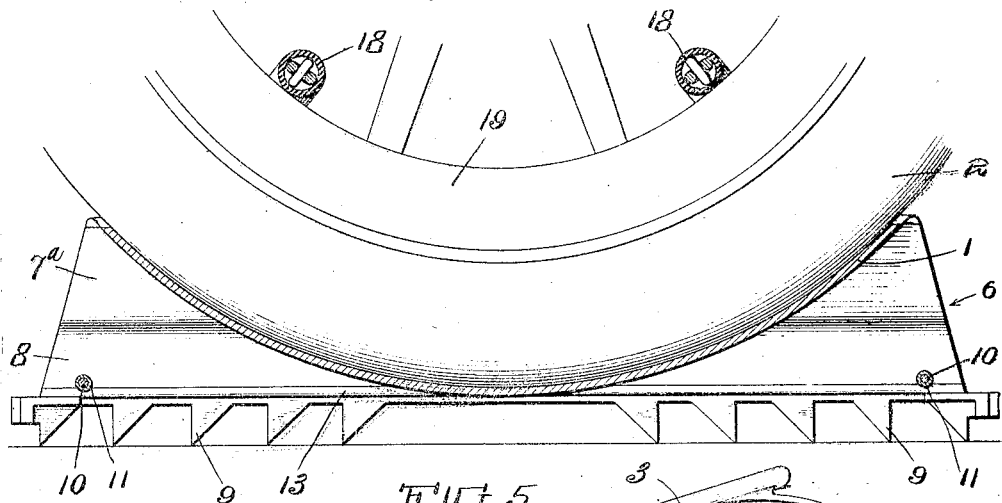
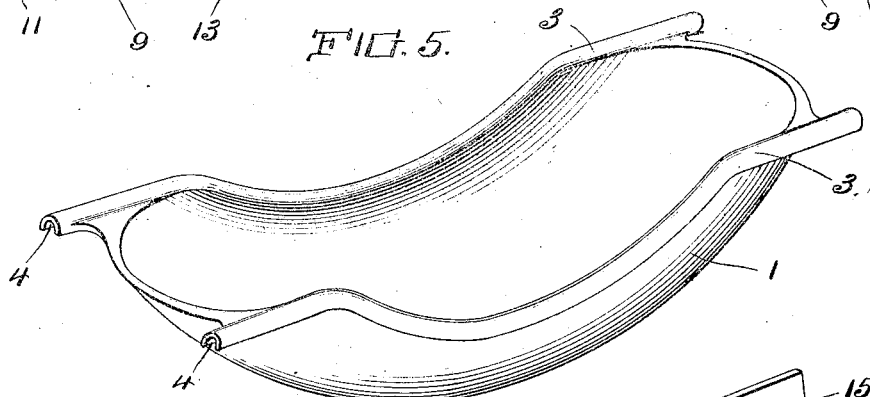
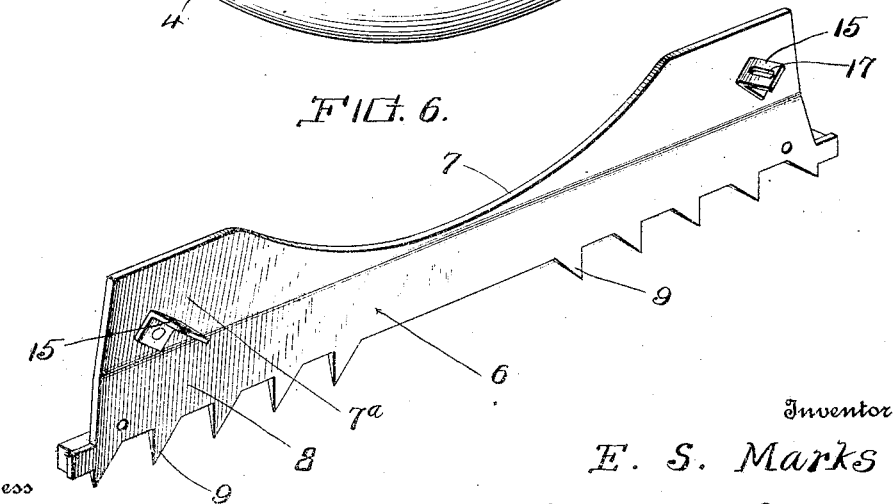

ELISHA S. MARKS, OF DETROIT, MICHIGAN.

METALLIC SHIPPING-SHOE.

1,235,356.   Specification of Letters Patent.   Patented July 31, 1917.

Application filed October 28, 1916. Serial No. 128,291.

*To all whom it may concern:*

Be it known that I, ELISHA S. MARKS, a citizen of the United States, residing at Detroit, in the county of Wayne and State of Michigan, have invented new and useful Improvements in Metallic Shipping Shoes, of which the following is a specification.

This invention relates to shipping shoes for use in connection with automobiles or other vehicles.

The object of the invention is to provide a device of this character which will hold a vehicle stationary when being shipped, thereby preventing injury to the same.

Another object of the invention is to provide a shipping shoe for use in connection with vehicles, which may be easily taken apart and packed for shipment when not in use.

A further object of the invention is to provide a device which is of simple construction, and will not get out of order and which can be manufactured at a minimum cost.

With the above objects in view the invention consists of the following novel combination and arrangement of parts hereinafter described and illustrated in the accompanying drawings, in which:

Figure 1 is a side elevation of a shoe applied to a portion of an automobile wheel;

Fig. 2 is an end view of the same;

Fig. 3 is a vertical longitudinal sectional view;

Fig. 4 is a central cross section;

Fig. 5 is a detailed perspective view of the rear supporting member; and

Fig. 6 is a detailed perspective view of one of the side plates.

Referring in detail to the drawings the numeral 1 indicates the wheel engaging member, which is transversely curved as shown, in order to conform to the curvature of the tire, which is shown at 2. This wheel engaging member is formed in both of its longitudinal edges with a curved bead 3, spaced from the member in order to provide grooves 4 upon its under side.

A supporting member having continuous side plates 6, which are adapted to engage the groove 4, are formed with curved portions 7, in order to conform to the said groove. The plates 6 are formed with a vertical portion 7ª and an outwardly flared portion 8, to provide a secure support for the member 1. The flared portion 8 has formed thereon a plurality of oppositely extending engaging points 9, adapted to engage the floor of a car or other transporting means to prevent movement of the shoe in either direction. As the side plates 8 are continuous it will be seen that they will effectually prevent any movement of the shoe, as might be the case were the said plates formed in sections, with the liability of separation.

In order to prevent the plates from spreading, they are provided with apertures for the reception of tie bolts 10, provided with spacing sleeves 11, located between the side plates and nuts 12, as indicated in Fig. 4. For the purpose of strengthening the plates 6 there is provided a longitudinal bead 13 formed along the entire length of the plates.

In order to secure the wheel upon the shoe there is provided an adjustable chain 14, which is secured to a lug 15 carried by one of the side plates, by means of a hook 16 engaging an aperture 17. The chain 14 is preferably covered with a rubber tube 18 to engage the felly 19 of the wheel to prevent injury thereto. The opposite end of the chain fastens through an aperture 20 formed in the lug 21 secured to the other side plate, the said chain being provided with a threaded shank 22 for engagement with a securing nut 23. By referring to the drawings it will be seen that one of these adjustable chains is provided at each end of the shoe and serves to secure the wheel in position.

From the foregoing when taken in connection with the accompanying drawings, it will be seen that the invention provides a strong and durable device to be used in connection with the shipment of vehicles, and when not in use may be readily taken apart and packed for return shipment.

Various changes in the form and proportion of the invention may be made, and the right is reserved to make such changes as will properly fall within the scope of the appended claims.

Having described the invention, what I claim is:

1. A shipping shoe comprising a wheel engaging member having grooves along each of its longitudinal edges, a supporting member detachably engaging said grooves and means for preventing the accidental movement of the shoe.

2. A shipping shoe comprising a transversely curved wheel engaging member, detachable outwardly flared continuous side supporting plates engaging grooves formed in the longitudinal edges of the said member and means for preventing the accidental movement of the shoe.

3. A shipping shoe comprising continuous side supporting plates, tie bolts connected to said plates at their lower ends, spacing sleeves mounted upon the said bolts and positioned between said plates and a wheel engaging member detachably engaging said plates along their upper edges.

In testimony whereof I affix my signature.

ELISHA S. MARKS.